US008510666B2

(12) United States Patent
Goose et al.

(10) Patent No.: US 8,510,666 B2
(45) Date of Patent: Aug. 13, 2013

(54) SYSTEMS FOR DEVELOPMENT AND/OR USE OF TELEPHONE USER INTERFACE

(75) Inventors: Stuart Goose, Berkeley, CA (US); Ingo Meyer, Eicklingen (DE); Daniel Conrad Benson, Lake Forest Park, WA (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 749 days.

(21) Appl. No.: 11/602,528

(22) Filed: Nov. 20, 2006

(65) Prior Publication Data
US 2007/0217580 A1  Sep. 20, 2007

Related U.S. Application Data

(60) Provisional application No. 60/782,588, filed on Mar. 14, 2006, provisional application No. 60/850,169, filed on Oct. 5, 2006.

(51) Int. Cl.
G06F 3/048 (2006.01)
G06F 3/00 (2006.01)
H04W 4/00 (2009.01)

(52) U.S. Cl.
USPC ............ 715/764; 715/810; 715/762; 370/328

(58) Field of Classification Search
USPC .......................... 715/764, 762, 810; 370/328
See application file for complete search history.

(56) References Cited

U.S. PATENT DOCUMENTS

| 5,555,369 | A  | * | 9/1996  | Menendez et al. ............ 715/762 |
| 5,870,088 | A  | * | 2/1999  | Washington et al. ......... 715/781 |
| 6,211,870 | B1 | * | 4/2001  | Foster ........................... 715/744 |
| 6,421,068 | B1 | * | 7/2002  | Ingrassia et al. .............. 715/762 |
| 6,425,120 | B1 | * | 7/2002  | Morganelli et al. ........... 717/109 |
| 6,486,893 | B1 | * | 11/2002 | Ramchandani et al. ...... 715/762 |

(Continued)

FOREIGN PATENT DOCUMENTS

| DE | 42 10 409 C1   | 8/1993 |
| DE | 101 54 643 A1  | 5/2003 |

(Continued)

OTHER PUBLICATIONS

Developing Series 60 Applications: A Guide for Symbian Os C++ Developers, Leigh Edwards, Bookcover, Richard Baxter, Mar. 1, 2004 , pp. 1-4.*

(Continued)

*Primary Examiner* — Andrey Belousov
*Assistant Examiner* — Erik Stitt
(74) *Attorney, Agent, or Firm* — Buchnan Ingersoll & Rooney PC

(57) ABSTRACT

Some embodiments provide a touch-sensitive device to receive a bias and to generate touch location information based on the bias, an element to secure a printed medium in contact with the touch sensitive device, the printed medium to depict a plurality of telephone interface controls, a memory to store a telephone interface layout associating one or more of the telephone interface controls with a respective touch location and a respective action, and a processor to receive touch location information from the touch-sensitive device, to determine a telephone interface control based on the touch location information and on the telephone interface layout, to determine an action based on the telephone interface control and on the telephone interface layout, and to perform the determined action.

16 Claims, 11 Drawing Sheets

(56) References Cited

U.S. PATENT DOCUMENTS

| | | | |
|---|---|---|---|
| 6,975,712 B1* | 12/2005 | Schnarel et al. | 379/142.01 |
| 7,093,198 B1* | 8/2006 | Paatero et al. | 715/746 |
| 7,236,576 B2* | 6/2007 | Schnarel et al. | 379/142.01 |
| 7,266,777 B2* | 9/2007 | Scott et al. | 715/762 |
| 7,272,497 B2* | 9/2007 | Koshiji et al. | 701/211 |
| 7,656,314 B2* | 2/2010 | Muranaka et al. | 341/22 |
| 7,946,775 B2* | 5/2011 | Dombrowski et al. | 400/490 |
| 2001/0053208 A1* | 12/2001 | Pinard et al. | 379/93.02 |
| 2003/0117436 A1* | 6/2003 | Kautto-Koivula et al. | 345/762 |
| 2004/0153973 A1* | 8/2004 | Horwitz | 715/530 |
| 2004/0207719 A1* | 10/2004 | Tervo et al. | 348/14.02 |
| 2004/0221241 A1* | 11/2004 | Kim | 715/810 |
| 2005/0048918 A1* | 3/2005 | Frost et al. | 455/41.2 |
| 2005/0097087 A1* | 5/2005 | Punaganti Venkata et al. | 707/3 |
| 2006/0015819 A1* | 1/2006 | Hawkins et al. | 715/780 |
| 2006/0050142 A1* | 3/2006 | Scott et al. | 348/14.05 |
| 2006/0123360 A1* | 6/2006 | Anwar et al. | 715/810 |
| 2006/0192771 A1* | 8/2006 | Rosenberg et al. | 345/173 |
| 2007/0013677 A1* | 1/2007 | Rosenberg et al. | 345/173 |
| 2007/0033254 A1* | 2/2007 | AlHusseini et al. | 709/205 |
| 2007/0061722 A1* | 3/2007 | Kronlund et al. | 715/705 |
| 2007/0113204 A1* | 5/2007 | Son et al. | 715/810 |
| 2007/0117552 A1* | 5/2007 | Gobburu et al. | 455/414.1 |
| 2007/0133052 A1* | 6/2007 | Yamada et al. | 358/1.15 |
| 2007/0220437 A1* | 9/2007 | Boillot | 715/762 |
| 2008/0088487 A1* | 4/2008 | Li | 341/22 |
| 2008/0172610 A1* | 7/2008 | Blair | 715/700 |
| 2008/0313552 A1* | 12/2008 | Buehler et al. | 715/760 |

FOREIGN PATENT DOCUMENTS

| | | |
|---|---|---|
| GB | 2 329 813 A | 3/1999 |
| WO | 99 20028 A2 | 4/1999 |
| WO | 01 67725 A2 | 9/2001 |
| WO | 03042805 A1 | 5/2003 |

OTHER PUBLICATIONS

Developing Series 60 Applications: A Guide for Symbian Os C++ Developers, Leigh Edwards, Chpt: Symbian OS Fundamentals, Richard Baxter, Mar. 1, 2004, pp. 1-7.*

Developing Series 60 Applications: A Guide for Symbian OS C++ Developers, Leigh Edwards, Chapter 5: Application UI Components, Richard Baxter, Mar. 1, 2004, pp. 1-19.*

Developing Series 60 Applications: A Guide for Symbian OS C++ Developers, Leigh Edwards, Chapter: Using Application Views, Engines and Key Systems APIs, Richard Baxter, Mar. 1, 2004, pp. 1-6.*

Developing Series 60 Applications: A Guide for Symbian OS C++ Developers, Leigh Edwards, Introduction to Symbian OS, Richard Baxter, Mar. 1, 2004, pp. 1-21.*

Developing Series 60 Applications: A Guide for Symbian OS C++ Developers, Leigh Edwards, Chapter:Dialog, Richard Baxter, Mar. 1, 2004, pp. 1-14.*

Developing Series 60 Applications: A Guide for Symbian OS C++ Developers, Leigh Edwards, Chapter:Dialogs, Richard Baxter, Mar. 1, 2004, pp. 1-3.*

Developing Series 60 Applications: A Guide for Symbian OS C++ Developers, Leigh Edwards, Chapter: Using Application Views, Engines and Key System APIs, Richard Baxter, Mar. 1, 2004, pp. 1-6.*

Developing Series 60 Applications: A Guide for Symbian OS C++ Developers, Leigh Edwards, Chapter:: Assessing System Capabilities, Richard Baxter, Mar. 1, 2004, pp. 1-21.*

Michael Juntao Yuan, Nokia SmartPhones Hacks, O'Reilly Media Inc, Jul. 25, 2005, pp. 1-4.*

Michael Juntao Yuan, Nokia SmartPhones Hacks, O'Reilly Media Inc, Chapter: Customize the Idle Screen, Jul. 25, 2005, pp. 1-8.*

Bob Swart, Paul Gustayson, Borland C++ Builder Developers Guide, Dec. 30, 2002, Chapter: Appendix B, C++ Mobile Application Development, Sams Publishing, pp. 1-5.*

Bob Swart, Paul Gustayson, Borland C++ Builder Developers Guide, Dec. 30, 2002, Chapter: Symbia OS, Sams Publishing, pp. 1-3.*

Bob Swart, Paul Gustayson, Borland C++ Builder Developers Guide, Dec. 30, 2002, Sams Publishing, pp. 1-3.*

Bob Swart, Paul Gustayson, Borland C++ Builder Developers Guide, Dec. 30, 2002, Chapter: PArt V Open Tools API: Extending the Borland IDE, Sams Publishing, pp. 1-5.*

"Hicom Executive 300", Siemens Aktiengesellschaft, Munchen, 1995, XP002445527, 8pgs.

"PCT international Search Report of the International Searching Authority", mailed Aug. 17, 2007, for PCT/US2007/006114, 4 pgs.

* cited by examiner

HOSPITAL

PERSONAL

HOTEL

YOUTHS

SYSTEMS FOR DEVELOPMENT AND/OR USE OF TELEPHONE USER INTERFACE

CROSS-REFERENCE TO RELATED APPLICATIONS

The present application claims priority to U.S. Provisional Patent Application Ser. No. 60/782,588, filed on Mar. 14, 2006 and entitled "Method and Apparatus for a Customizable Telephone Interface", and to U.S. Provisional Patent Application Ser. No. 60/850,169, filed on Oct. 5, 2006 and entitled "Method and Apparatus for Creating Customizable Telephone Interfaces", the contents of which are incorporated herein by reference for all purposes.

COPYRIGHT STATEMENT

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND

Conventional telephones typically receive user input via the ubiquitous numeric keypad. In the most basic arrangement, a user requests a telephone connection with a remote party by dialing the remote party's telephone number using the keys of such a keypad. A conventional telephone keypad may include letters associated with each key in order to enable input of alpha characters.

Interactive voice response (IVR) systems attempt to address the limitations of the conventional keypad in order to provide a more sophisticated exchange between a telephone user and a remote system. In particular, IVR systems provide audible menus which a user may navigate by depressing keypad keys. Most users, however, find IVR systems to be frustrating and inefficient for all but the simplest of tasks.

Modern telephone systems may provide a small display screen in addition to the traditional keypad. The screen may display information typed by a user using the keypad and/or other information such as date and time. In some instances, the screen may provide labels for soft keys having functions that vary depending on operating context.

Systems are desired for efficiently providing telephone users with a useful interface. Such a system may be customizable and/or sufficiently inexpensive to manufacture.

According to various embodiments, the invention generally relates to systems to provide user interfaces for telephone systems. More particularly, some embodiments are concerned with systems to generate and/or support customizable telephone interface layouts.

SUMMARY OF THE INVENTION

Some embodiments provide a system, method, telephone, program code and/or means to receive a first user indication of a telephone interface control, receive a second user indication of a location associated with the telephone interface control, receive a third user indication of an action associated with the telephone interface control, and generate, based on the first user indication, the second user indication, and the third user indication, a telephone interface layout formatted according to a markup language and usable by a telephone to provide a user interface.

In further aspects, the telephone interface layout comprises an image depicting a plurality of telephone interface controls and data associating one or more of the plurality of telephone interface controls with a respective location and a respective action. The image may be depicted on a printed medium.

According to some embodiments, a system includes a touch-sensitive device to receive a bias and to generate touch location information based on the bias, an element to secure a printed medium in contact with the touch sensitive device, the printed medium to depict a plurality of telephone interface controls, and a memory to store a telephone interface layout associating one or more of the telephone interface controls with a respective touch location and a respective action. Also included may be a processor to receive touch location information from the touch-sensitive device, to determine a telephone interface control based on the touch location information and on the telephone interface layout, to determine an action based on the telephone interface control and on the telephone interface layout, and to perform the determined action.

Some aspects may provide reception of touch location information from a touch-sensitive device, and determination of a telephone interface control based on the touch location information and on a telephone interface layout. The telephone interface layout may be formatted according to a markup language and may associate one or more of the telephone interface controls with a respective touch location and a respective action. An action may be determined based on the telephone interface control and on the telephone interface layout, and the determined action is performed.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION OF SPECIFIC EMBODIMENTS

Figure 1:
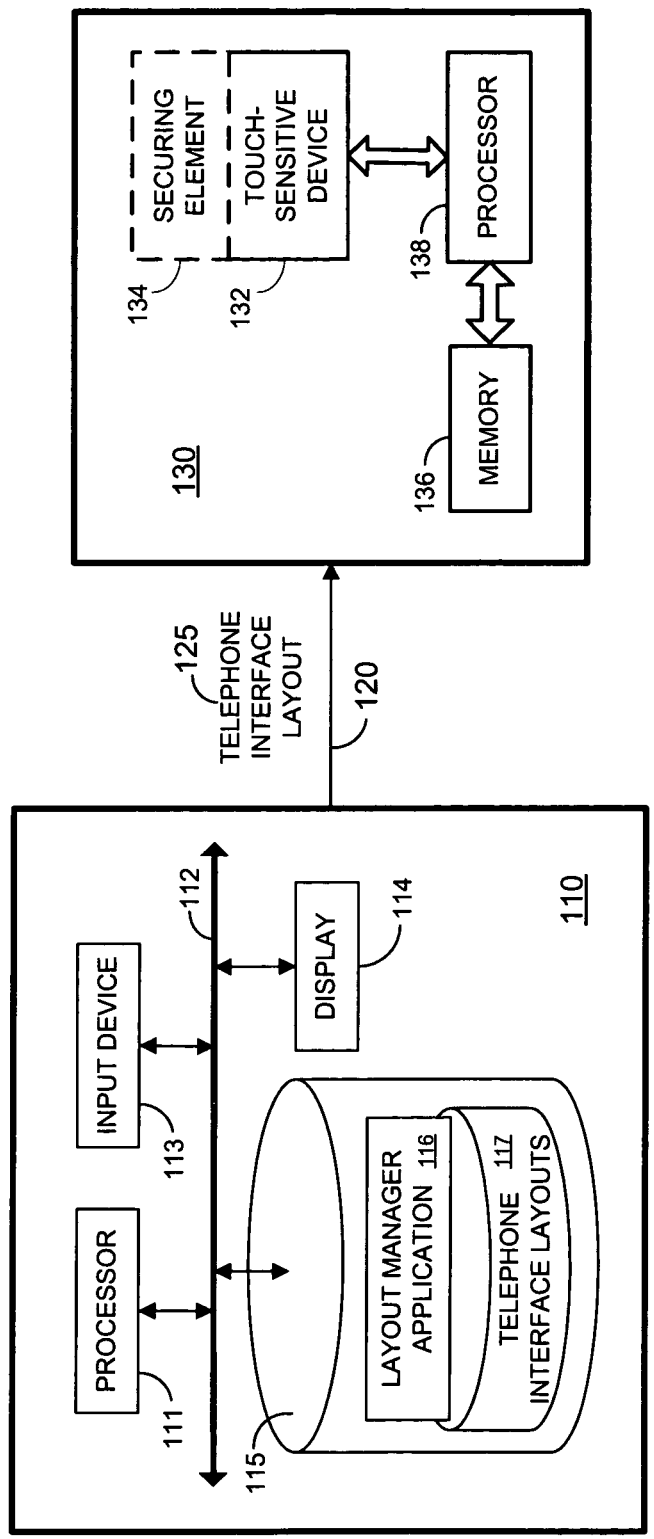
FIG. 1 is a block diagram of a system according to some embodiments.

FIG. 1 is a block diagram of system 100 according to some embodiments. System 100 may comprise any number of hardware and/or software elements for performing the functions attributed thereto herein. System 100 may be used to generate and/or use a telephone interface layout according to some embodiments.

System 100 includes computing system 110, communication link 120 and telephone 130. Computing system 110 may include any type of computing system or systems that is or becomes known, including but not limited to a desktop computer, a laptop computer, a tablet personal computer, a personal digital assistant, and a cellular telephone. Computing system 110 may operate to generate a telephone interface layout according to some embodiments.

More specifically, some embodiments of computing system 110, which are not limited to the structure illustrated in FIG. 1, operate to receive a first user indication of a telephone interface control, to receive a second user indication of a location associated with the telephone interface control, to receive a third user indication of an action associated with the telephone interface control, and to generate a telephone interface layout based on the first user indication, the second user indication, and the third user indication. The telephone interface layout may be formatted according to a markup language and usable by a telephone to provide a user interface.

Computing system 110 of FIG. 1 includes processor 111 in communication with communication bus 112. Processor 111 may comprise any controller or processor capable of executing program code. More specifically, processor 111 executes program code to control the elements of computing system 110 to provide desired functionality such as that described above.

Also in communication with communication bus 112 are input device 113 and display 114. A user may manipulate input device 113 to transmit a user indication to system 110. Such an indication may indicate one or more of a telephone interface control, a location associated with the telephone interface control, and an action associated with the telephone interface control. Input device 113 may comprise any known input device, including a keyboard, mouse, touch pad, voice-recognition system, or any combination of these devices.

Display 114 may display graphics and text in response to commands issued by processor 112. The displayed graphics and text may comprise a user interface of an application for designing telephone interface layouts. In this regard, display 114 may display a telephone interface layout to be used by telephone 130 as will be described below. Display 114 may comprise an integral or separate CRT display, flat-panel display or the like.

Data storage device 115 is also coupled to bus 112 and stores, among other data, processor-executable program code of layout manager application 116. Processor 111 may execute the program code in order to control computing system 110 to generate a telephone interface layout according to some embodiments. Such a generated telephone interface layout may be stored among telephone interface layouts 117 of storage device 115.

Computing system 110 according to some embodiments may include fewer or more elements arranged differently than illustrated in FIG. 1. In some embodiments, system 110 includes a printer for outputting a printed medium depicting an image of a plurality of telephone interface controls. Computing system 110 may also or alternatively include a communication port for transmitting data to and receiving data from devices external to computer system 110. Such a communication port may transmit telephone interface layout 125 to telephone 130 over link 120 according to some embodiments.

The program code of layout manager application 116 may be read from a computer-readable medium, such as a floppy disk, a CD-ROM, a DVD-ROM, a Zip℧ disk, a magnetic tape, or a signal encoding the process steps, and then stored in data storage device 115 in a compressed, uncompiled and/or encrypted format. In alternative embodiments, hard-wired circuitry may be used in place of, or in combination with, processor-executable code for implementation of processes according to some embodiments. Thus, embodiments are not limited to any specific combination of hardware and software.

Communication link 120 may comprise any one or more suitable media for transmitting telephone interface layout 125 to telephone 130. Communication link may support any suitable communication protocol(s). In some embodiments, link 120 may comprise a USB cable, a serial cable, a network cable, and/or a wireless link. In a case that telephone interface layout 125 comprises a printed medium, link 120 may comprise the physical means by which the medium is delivered to telephone 130.

Telephone 130 may operate in some embodiments to receive touch location information from a touch-sensitive device, and determine a telephone interface control based on the touch location information and on a telephone interface layout. The telephone interface layout may be formatted according to a markup language and may associate one or more of the telephone interface controls with a respective touch location and a respective action. Telephone 130 may determine an action based on the telephone interface control and on the telephone interface layout, and may proceed to perform the determined action.

Telephone 130 of FIG. 1 includes touch-sensitive device 132. Touch-sensitive device 132 may operate according to some embodiments to receive a bias and to generate touch location information based on the bias. Touch-sensitive device 132 may comprise any type of suitable device that is currently or hereafter known. Touch-sensitive device 132 may comprise a simple touch-sensitive panel, a touch-sensitive panel providing a controllable display on its surface, and/or a panel capable of providing haptic feedback to a user. In this regard, haptic feedback comprises a force delivered by device 132 to a user of telephone 130. The force may simulate the "click" of a keypress, a buzzing sensation, or any other suitable phenomena. As will be described in detail below, some embodiments provide customizable haptic feedback based on generated touch location information.

Touch-sensitive device 132 may be equipped with an integral display for displaying depictions of a plurality of telephone interface controls. The depictions may comprise elements of a telephone interface layout received from computing system 110. Accordingly, the telephone interface layout comprises an image file that may be displayed by the integral display of touch-sensitive device 132.

Alternatively, some embodiments of telephone 130 may include element 134 to secure a printed medium in contact with device 132. Such a printed medium, some embodiments of which will be described below, may depict the aforementioned plurality of telephone interface controls. The printed medium may therefore be considered part of a telephone interface layout that is associated with the plurality of telephone interface controls.

Accordingly, a user may touch a telephone interface control displayed by the integral display or presented on a printed medium secured by securing element 134. In response, touch-sensitive device 132 generates location information associated with a location at which the touch is sensed.

In this regard, telephone 130 also includes memory 134 to store program code of a telephone application and at least one telephone interface layout associating one or more of the telephone interface controls with a respective touch location. The telephone interface layout may also associate one or more of the telephone interface controls with a respective action.

The following description provides an example of operation of system 100 according to some embodiments. A user may initially exert a bias against one of the telephone interface controls displayed by the integral display or depicted by the printed medium. Device 132 may, in response, generate touch location information corresponding to a location of the telephone interface control against which the bias is exerted.

Processor 138 of telephone 130 may execute the program code of memory 134 to receive the touch location information from touch-sensitive device 132. Based on a telephone interface layout stored in memory 134, processor 138 may determine a telephone interface control associated with the touch location information. Processor 138 may then determine, also based on the telephone interface layout, an action associated with the telephone interface control. Lastly, processor 138 controls elements of telephone 130 to perform the determined action.

The elements of system 100 may include many unshown elements to provide necessary or optional features. These elements may be embodied by any suitable combinations of hardware, software and/or firmware, and may share some elements therebetween. Computing system 110 and telephone 130 may be located adjacent to or remote from one another, and may be elements of a single apparatus. Either or both of computing system 110 and telephone 130 may be embodied by several devices located adjacent to or remote from one another.

Figure 2:
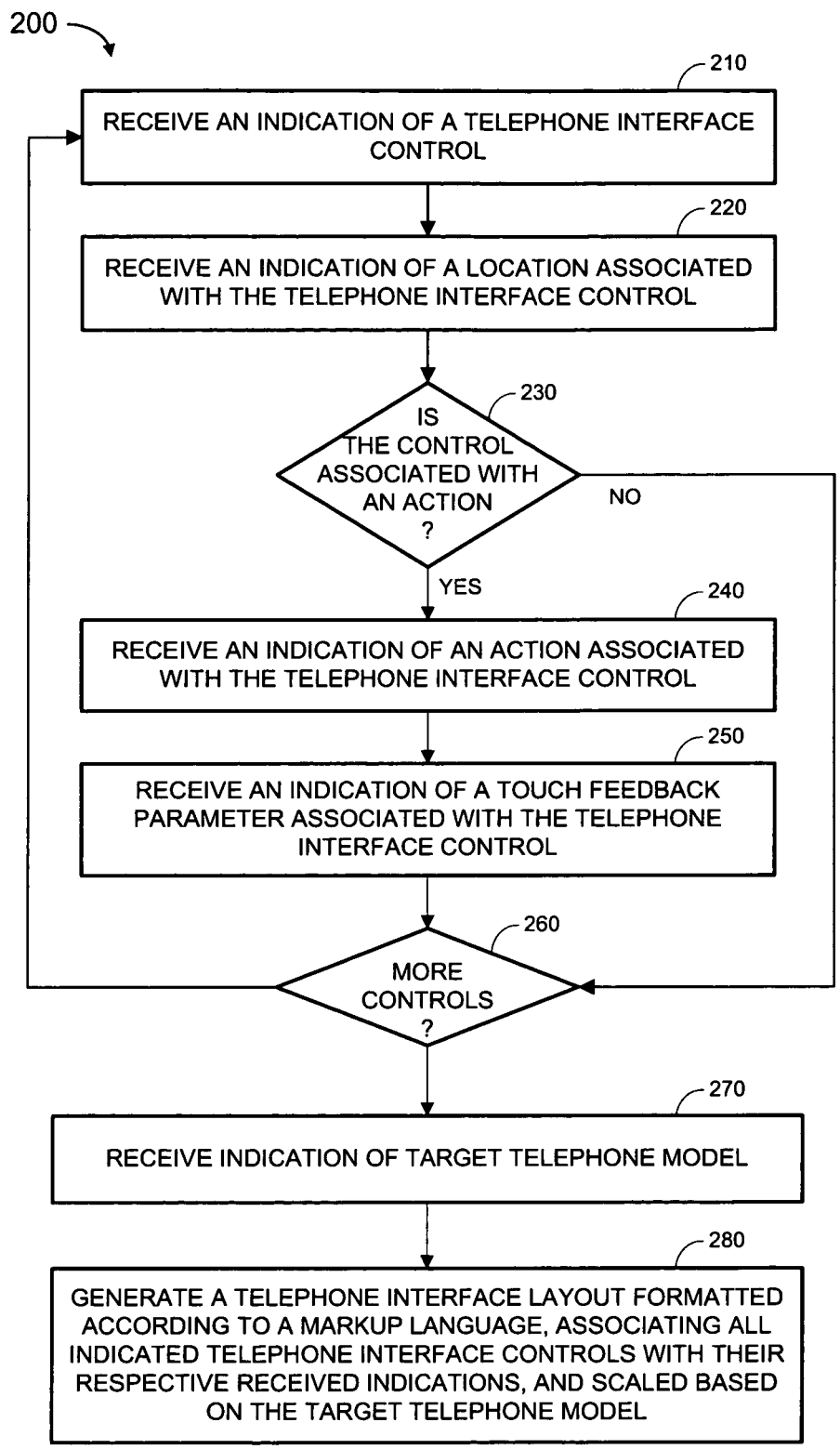
FIG. 2 is a flow diagram of a process according to some embodiments.

FIG. 2 is a flow diagram of process 200 according to some embodiments. Process 200, as well as the other processes described herein, may be embodied in program code executed by a processor or using any suitable hardware and/or software arrangement. Process 200 is described below as executed by computing system 110, but may be executed by any suitable device or devices that are or become known.

Process 200 may comprise process steps embodied in program code. Accordingly, prior to process 200, a user may operate computing system 110 to launch an application including such program code. In some embodiments, process 200 is initiated by launching layout manager application 116 of storage device 115.

Figure 3:
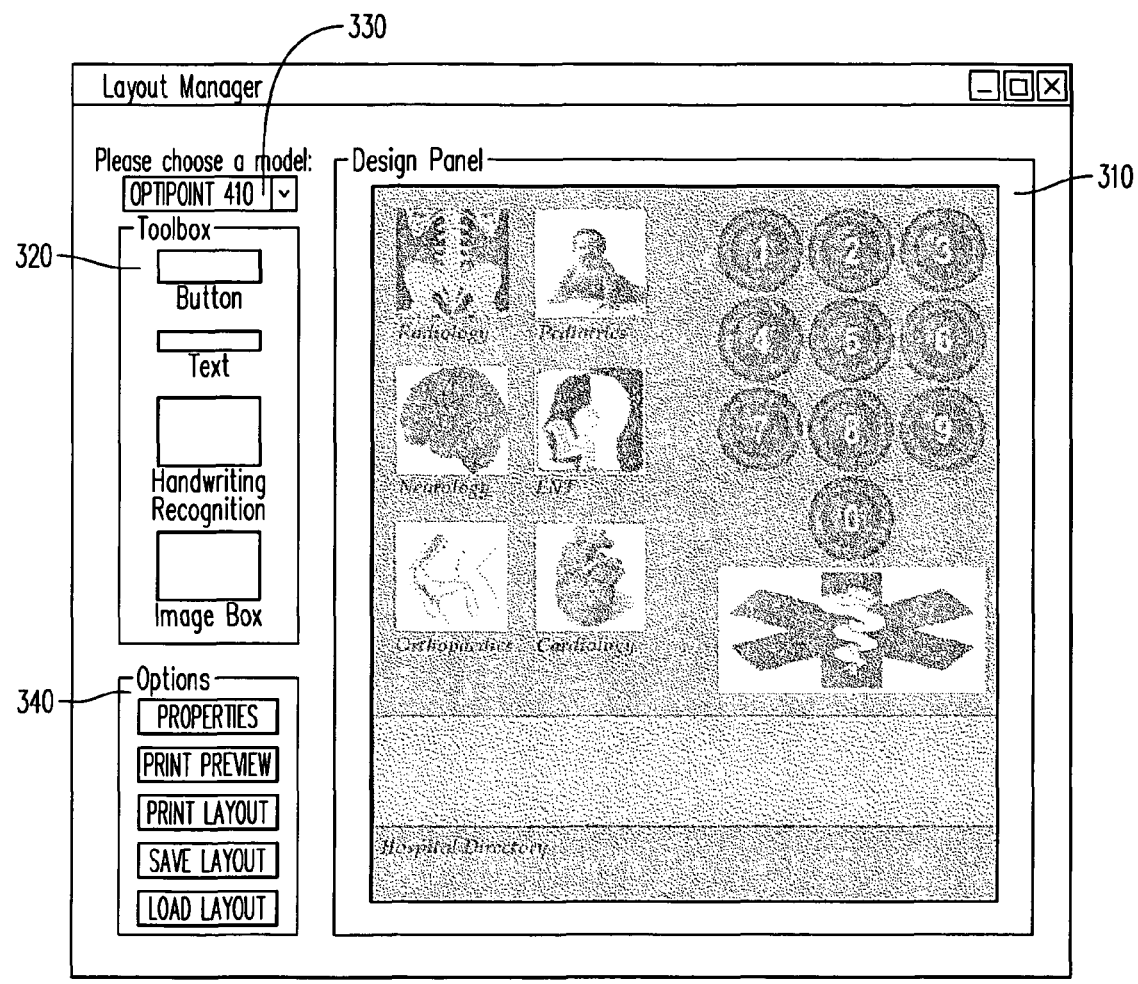
FIG. 3 comprises an outward view of a user interface according to some embodiments.

According to some embodiments, display 114 displays user interface 300 of FIG. 3 upon launching layout manager application 116. User interface 300 includes design panel 310 for displaying graphical elements of a telephone interface layout, toolbox 320 for selecting widgets for inclusion in a telephone interface layout, drop-down menu 330 for selecting a telephone model in which the telephone interface layout is intended to be used, and options 340 for performing associated tasks.

Initially, at step 210, an indication of a telephone interface control is received. The first user indication may comprise user selection of a widget of toolbox 320. For example, the Button widget may represent a selectable button or a rectangle of a telephone interface layout, the Label may represent text to include in the telephone interface layout, the Handwriting Recognition widget may represent an area in which handwriting may be input, and the ImageBox widget may provide an area to include a selectable image.

Next, an indication of a location is received at step 220. The received indication is associated with the telephone interface control indicated at step 210. Any number of systems for inputting and receiving the location indication may be employed at step 220. For example, the user may "drag and drop" a selected widget from toolbox 320 to a location of design panel 310. Step 220 therefore comprises determining the location to which the widget was dropped. The dropped widget may be aligned within design panel 310 using a "snap to grid" feature.

At step 230, it is determined whether the telephone interface control is to be associated with an action. If so, flow proceeds to step 240, at which an indication of an action associated with a telephone interface control is received. The indication of the action may be input and/or received in any suitable manner. According to some embodiments of step 240, a user may select a displayed telephone interface control and may then select Properties button of options 340. In response, display 114 may display property sheet 400 of FIG. 4, which the user may manipulate to indicate an action associated with the selected telephone interface control.

As shown, property sheet 400 allows a user to specify any number of parameters associated with a telephone interface control. Specific to step 240, window 400 provides text boxes 405 and 410 for specifying an action type and an action value, respectively. The action type and action value define an action that will be performed upon user selection of the associated telephone interface control. For example, an ImageBox telephone interface control may be associated with an action name "Dial" and an action number "18004278427". Accordingly, a telephone displaying the telephone interface control may dial the number upon user selection of the control.

Property sheet 400 may also be used to input and receive an indication of a touch feedback parameter associated with the subject telephone interface control. Specifically, area 415 of window 400 allows a user to associate touch feedback parameters with the telephone interface control defined by property sheet 400. The touch feedback parameters may define a haptic feedback to be delivered to a user upon selection of the telephone interface control.

Figure 4:
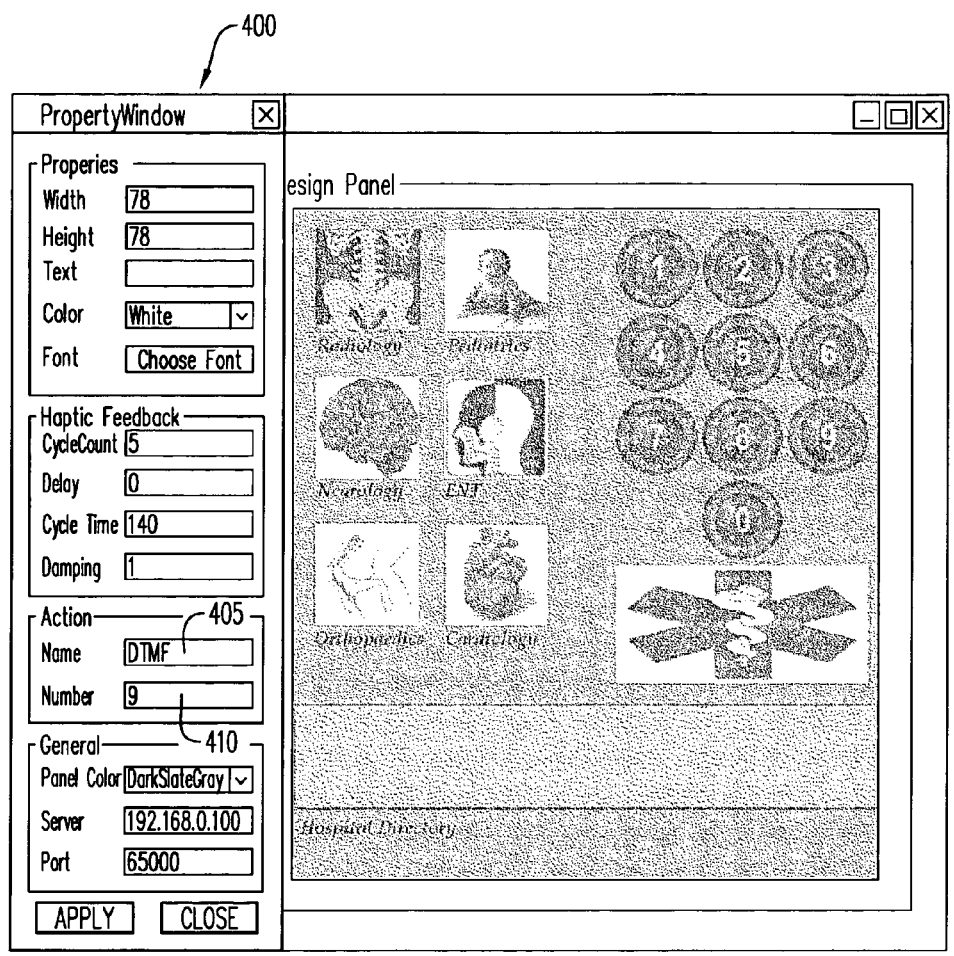
FIG. 4 comprises an outward view of a user interface including a property sheet according to some embodiments.

As illustrated in FIG. 4, some embodiments may allow a user to manipulate any number of relevant parameter values with a telephone interface control. These parameters may include, but are not limited to, a size, a color, an image file, text, and optical character recognition parameters (e.g. an IP address and port number of a handwriting recognition server). The types of parameters associated with a telephone interface control may depend on the type of the telephone interface control. For example, Text widgets might not be associated with an action and/or touch feedback parameters.

Flow returns to step 210 if it is determined at step 260 that a user intends to define additional telephone interface controls. If not, an indication of a target telephone model is received at step 270. Returning to FIG. 3, the indication of the target telephone model may be received via drop-down box 330. As will be described below, dimensions of the target telephone model may be used to determine dimensions of telephone interface controls of a subsequently-generated telephone interface layout.

At step 280, a telephone interface layout formatted according to a markup language is generated. The layout associates all indicated telephone interface controls with their respective indications received at steps 220, 240 and 250, and may be scaled based on the indicated target telephone model. A telephone interface layout according to some embodiments may include data providing the associations mentioned above, as well as displayable graphics data and/or a printed medium depicting the telephone interface controls.

According to some embodiments, step 280 begins in response to user selection of one of the Print Preview, Print Layout or Save Layout buttons of options 340. The images within design panel 310 is measured in pixels and may be scaled to millimeters for both saving the layout in markup language format and for printing a depiction of the layout, if needed. For example, the selected optiPoint 410 telephone includes a touch pad measuring 112 mm in width×131 mm in height. Assuming a fixed height of 512 pixels, the width of the panel is calculated as 112 mm/131 mm*512 pixels=438 pixels.

Next, a snapshot of the images within design panel 310 is obtained using a BitBit (Bit Block Transfer) function. The function creates a bitmap image by moving a rectangular block of bits from the display memory into Random Access Memory of system 110. A frame (e.g. a Graphics object in C++) is then built to hold the bitmap image. This frame is mapped in millimeters and stretches or shrinks the bitmap image to maintain the proper dimensions.

The code snippet below sets forth one strategy to convert the telephone interface layout from pixels to millimeters. According to the code, each specified telephone interface control (i.e. widget) is stored in an array "widgets") and is iterated using a for-each loop. The location and the dimensions of each widget are calculated by determining the ratio between its width in millimeters and its width in pixels, and by multiplying the ratio with the property to be transformed, e.g. the location of the widget in the x-direction.

```
WidgetInfo[ ] widgetInfoList = new WidgetInfo[widgets.Count];
WidgetInfo widgetInfo; //contains all information about a widget
//get millimeter per pixel...
double mmPerPixelX = (double)model.Width / (double)panelWidth;
double mmPerPixelY = (double)model.Height / (double)panelHeight;
//browse through the list of widgets and calculate their properties
foreach(Control control in widgets) {
    ...
    widgetInfo.Type = control.GetType( ).Name;
    widgetInfo.LocationX = (int)Math.Round(mmPerPixelX *
control.Location.X);
    widgetInfo.LocationY = (int)Math.Round(mmPerPixelY *
control.Location.Y);
    widgetInfo.Width = (int)Math.Round(mmPerPixelX * control.Width);
    widgetInfo.Height = (int)Math.Round(mmPerPixelY * control.Height);
    ...
    widgetInfoList[i++] = widgetInfo;
}
```

The markup language-formatted telephone interface layout includes two main parts according to some embodiments. A first part holds general information associated with the target telephone, and a second part contains an array of a plurality of telephone interface controls. The following is an example of the above-described first part of a layout according to some embodiments.

```
<HRServerAddress>192.168.0.100</HRServerAddress>
    <HRPortNumber>65000</HRPortNumber>
    ...
- <HapticInfo>
        <MinForce>20</MinForce>
        <PenDownForce>30</PenDownForce>
        <PenUpForce>20</PenUpForce>
        <HoverForce>10</HoverForce>
        <NoiseLevel>5000</NoiseLevel>
    </HapticInfo>
- <PhoneModel>
        <Name>Siemens</Name>
        <Type>optiPoint 410</Type>
        <Width>112</Width>
        <Height>131</Height>
```

```
    </PhoneModel>
- <WidgetInfoList>
    ...
</WidgetInfoList>
</LayoutData>
```

The second part of markup language-formatted telephone interface layout may list each telephone interface control of the layout, and may also associate one or more of a location, dimensions, an action, and touch feedback with each control. The following example includes information relating to two telephone interface controls (i.e., widgets).

```
...
- <WidgetInfoList>
    - <WidgetInfo>
        <LocationX>25</LocationX>
        <LocationY>111</LocationY>
        <Width>19</Width>
        <Height>12</Height>
        <CycleCount>10</CycleCount>
        <Delay>20</Delay>
        <CycleTime>280</CycleTime>
        <Damping>0</Damping>
        <Type>PictureBox</Type>
        <Text/>
        - <Action>
            <Name>Number 0</Name>
            <Number>0</Number>
        </Action>
    </WidgetInfo>
    - <WidgetInfo>
        <LocationX>4</LocationX>
        <LocationY>74</LocationY>
        <Width>19</Width>
        <Height>12</Height>
        ...
        <Type>PictureBox</Type>
        <Text/>
        - <Action>
            <Name>Number 1</Name>
            <Number>1</Number>
        </Action>
    </WidgetInfo>
    ...
</WidgetInfoList>
</LayoutData>
```

According to some embodiments, the location information association with a telephone interface control may represent areas of a touchscreen surrounding the telephone interface control. Therefore, user depression of one of these surrounding areas may be considered a selection of the corresponding interface control. Such embodiments may be beneficial for elderly users.

As mentioned above, some embodiments of process 200 generate a telephone interface layout including a printed medium depicting a plurality of telephone interface controls and a markup language-formatted data file associating each of the plurality of interface controls with a location, etc. In some embodiments, the data file includes information that may be used by an electronic display to generate an image of the telephone interface controls. Such information may comprise a .jpg image, an HTML page, or the like. In some embodiments, a target telephone may include a rendering engine for reading the above-described XML file in order to display the telephone interface controls of the layout.

Figure 5:
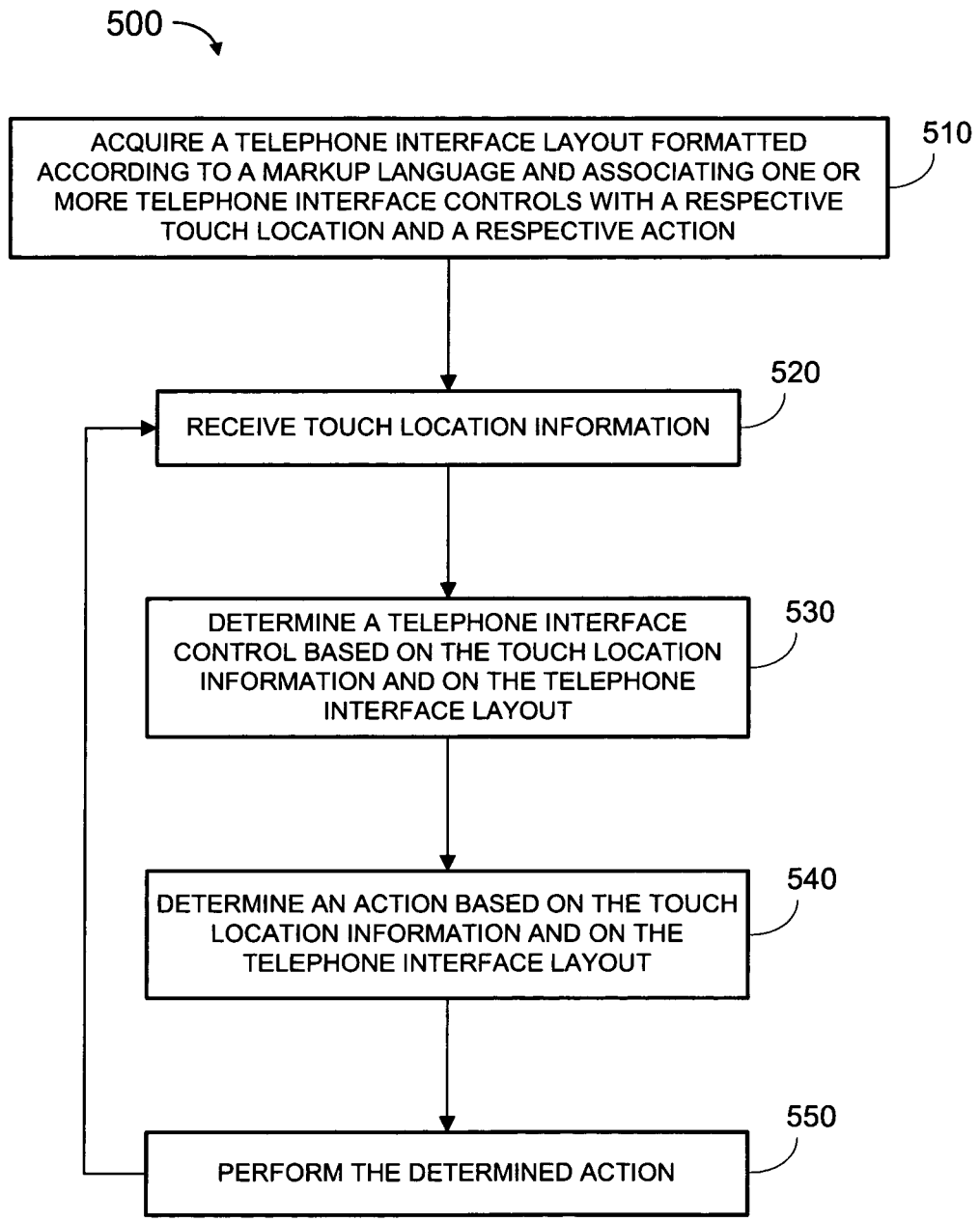
FIG. 5 is a flow diagram of a process according to some embodiments.
Figure 6A:
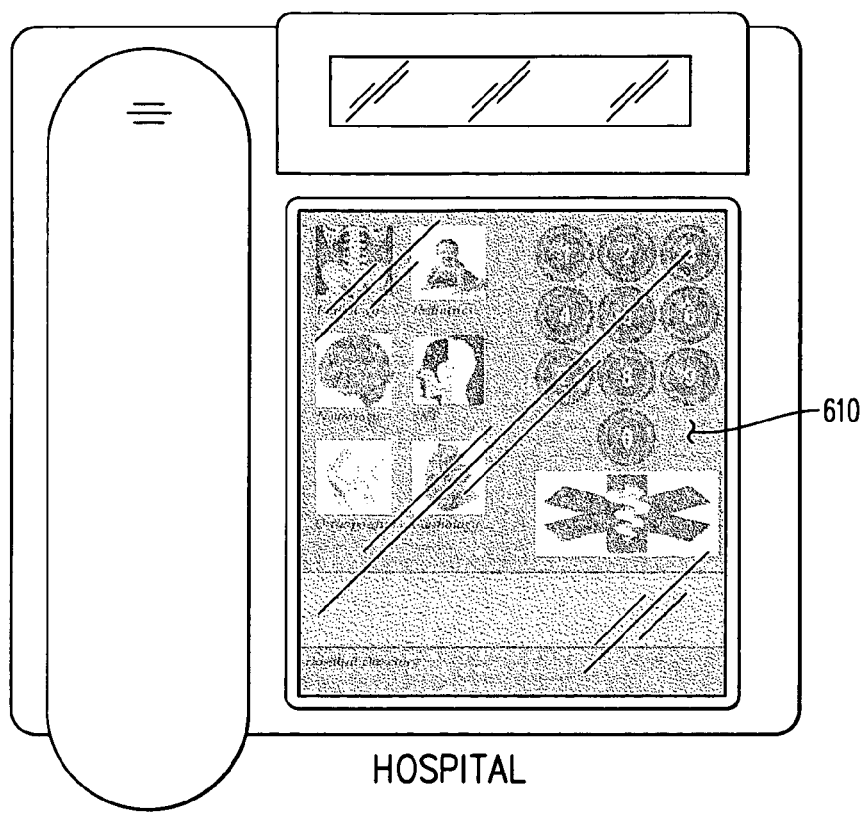
FIG. 6 comprises outward views of telephone interface layouts according to some embodiments.
Figure 6B:
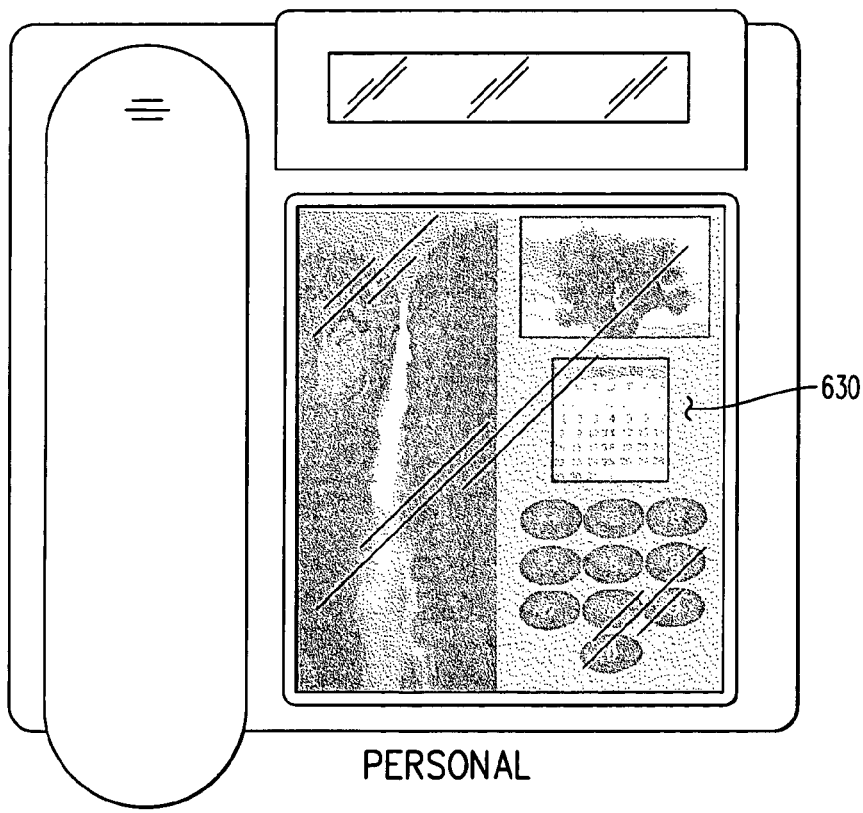
Figure 6C:
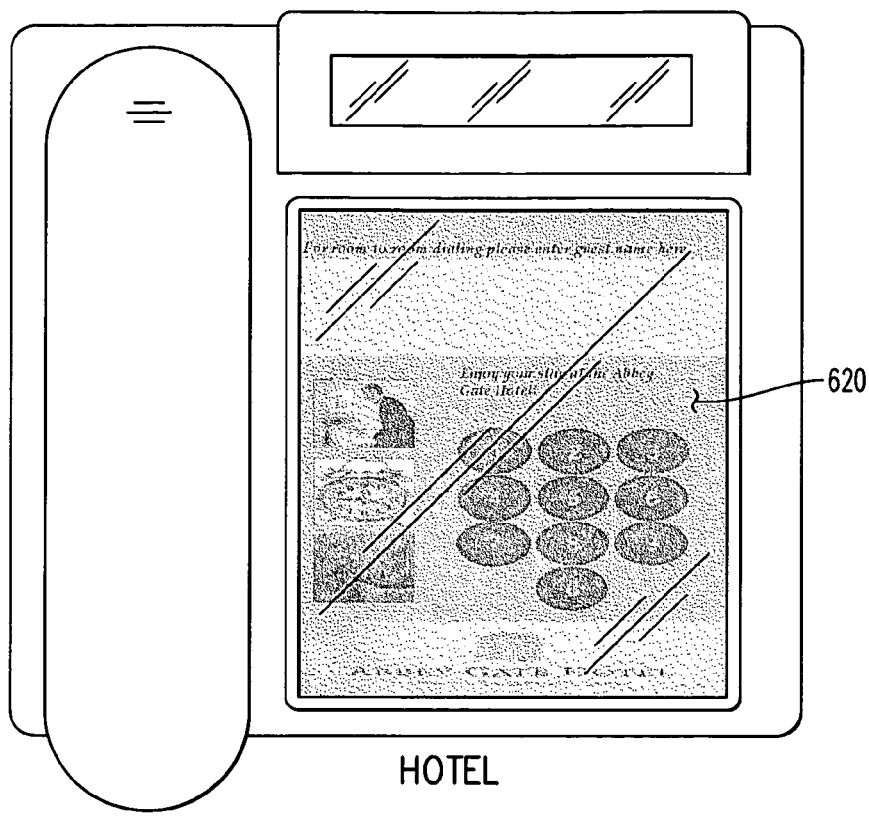
Figure 6D:
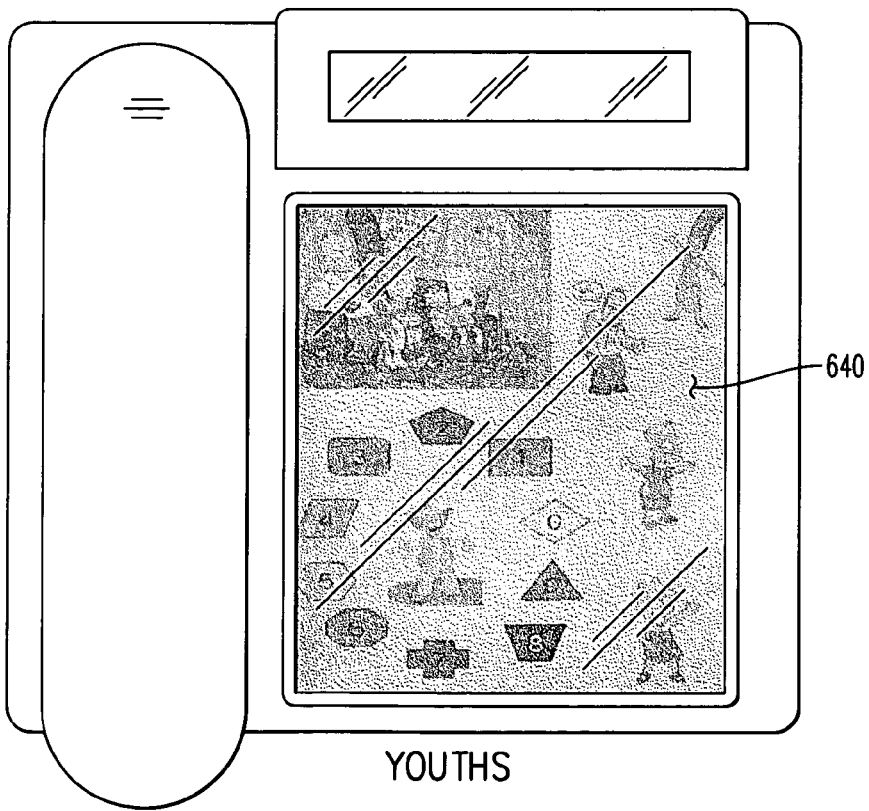

FIG. 5 is a diagram of process 500 according to some embodiments. Process 500 may be executed by a telephone such as, but not limited to, telephone 130 of FIG. 1. Process

500 may be embodied in processor-executable program code and may therefore be stored in memory 136 and executed by processor 138 of telephone 130.

A telephone interface layout is initially acquired at step 510. The acquired layout is formatted according to a markup language and associates one or more telephone interface controls with a respective touch location and a respective action. The layout may comprise an XML-formatted file such as those described above, and may be acquired via any suitable transmission means including but not limited to a wireless link, a wired link (e.g. a USB cable), and a readable medium storing the file.

According to some embodiments, a process is executed upon startup to load the acquired telephone interface layout. A user may be asked to select from two or more telephone interface layouts to load. In some embodiments, the startup process also displays an image depicting a plurality of telephone interface controls based on the loaded telephone interface layout. Other embodiments which utilize a non-imaging touch-sensitive device may comprise securing a printed medium depicting such an image to the non-imaging touch-sensitive device.

FIG. 6 illustrates four outward views of a telephone after performing step 510 according to some embodiments. Images 610 through 640 each display a plurality of telephone interface controls associated with at least a location within a markup language-formatted file. In some embodiments, images 610 through 640 are printed on a medium that is secured to a touch-sensitive device (not shown). In other embodiments, images 610 through 640 are displayed by a touch-sensitive screen such as a touch-sensitive liquid crystal display. The former embodiments may provide an inexpensive customizable telephone. Such a telephone may be produced by replacing its conventional numeric keypad with a touch-sensitive device.

Figure 7:
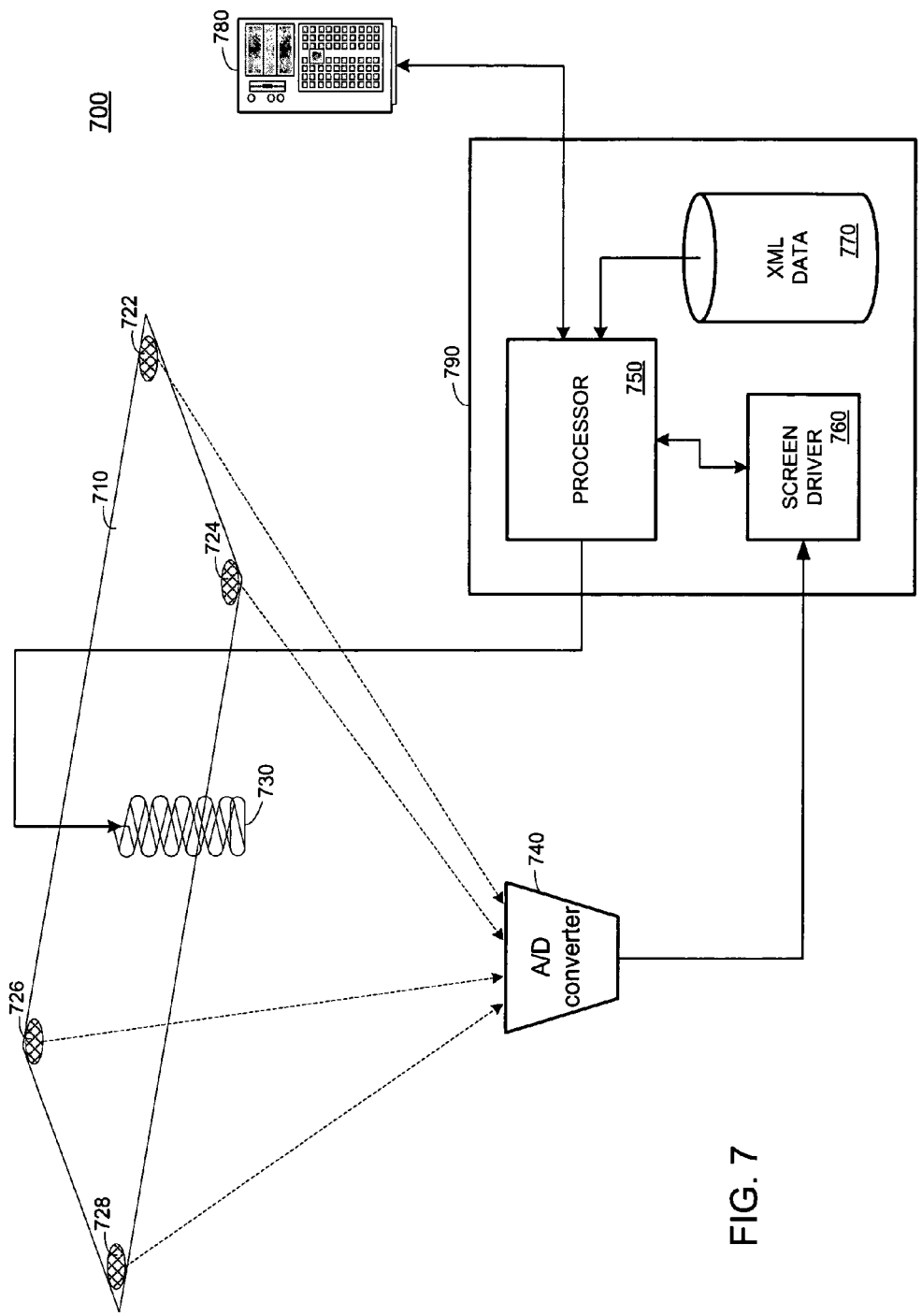
FIG. 7 comprises a diagram illustrating system operation according to some embodiments.

FIG. 7 illustrates system 700 to execute process 500 according to some embodiments. Touch-sensitive device 710 of system 700 may comprise an imaging or a non-imaging touchscreen. Prior to step 520, system 700 may initialize, configure and/or calibrate its hardware. Moreover, the acquired telephone interface layout that is stored among XML data 770 may be parsed to create a list of each telephone interface control (i.e. widget) and their associated locations, actions, and/or touch feedback parameters. Next, processor 750 polls driver 760 of screen 710 at periodic intervals (e.g., 10 ms) to determine if a bias has been exerted thereon.

If so, touch location information is received at step 520. According to some embodiments, converter 740 may receive an analog signal from each of force sensors 722, 724, 726 and 728, and may transmit a digital signal based on the four signals over an SPI bus to driver 760. Processor 750 may then receive a corresponding coordinate pair upon polling driver 760.

A telephone interface control is determined at step 530 based on the touch location information and the loaded telephone interface layout. In some embodiments, step 530 simply comprises identifying a telephone interface control that is associated with the location at which screen 710 was touched. An action associated with the determined interface control is similarly determined from the telephone interface layout at 540.

The determined action is performed at step 550. An action may include, but is not limited to, dialing individual digits, dialing preset telephone numbers (i.e., speed dialing), and performing handwriting recognition. The action may be performed by using an application programming interface provided by system 700 or by otherwise controlling elements of system 700 to perform the determined action.

FIG. 7 also illustrates server 780, which may be remotely located and used to perform any required handwriting recognition processing. In some embodiments of process 500, processor 750 determines that received touch location information corresponds to a handwriting recognition interface control, and then captures a stream of coordinate pairs until either a pen-up condition occurs or a fixed-length array is completely filled.

A TCP socket is then opened to handwriting recognition server 780 based on information (e.g. IP address, port number) specified by the telephone interface layout. The stream of coordinate pairs is transmitted to server 780 via the socket. Handwriting recognition server 780 processes the received data, responds with a recognized character, and closes the socket. The recognized character may be displayed on an available simple text display of the phone, if available.

Handwriting recognition server 780 may be multi-threaded and may therefore serve multiple individual telephones concurrently. Handwriting recognition server 780 may alternatively be implemented on PCB 790. Handwriting received via a handwriting recognition interface control may also or alternatively be transmitted directly to a called party without recognition processing. Such an embodiment may be used to forward an authorizing signature to the called party.

According to some embodiments such as that illustrated in FIG. 7, process 500 also includes providing touch feedback to a user based on touch feedback information of the telephone interface layout. In particular, processor 750 may determine such feedback based on the layout and on a telephone interface control determined at 530. The feedback may be represented by parameters such as cycle time, delay, cycle count, and damping, and may be implemented by driving coil 730 to generate a haptic vibration pattern. Coil 730 is representative of any number of coils that may be used to generate haptic feedback through screen 710. The circuitry of touchscreen 710 used to drive coil 730 may be connected to GPIO pins of PCB 790.

Figure 8:
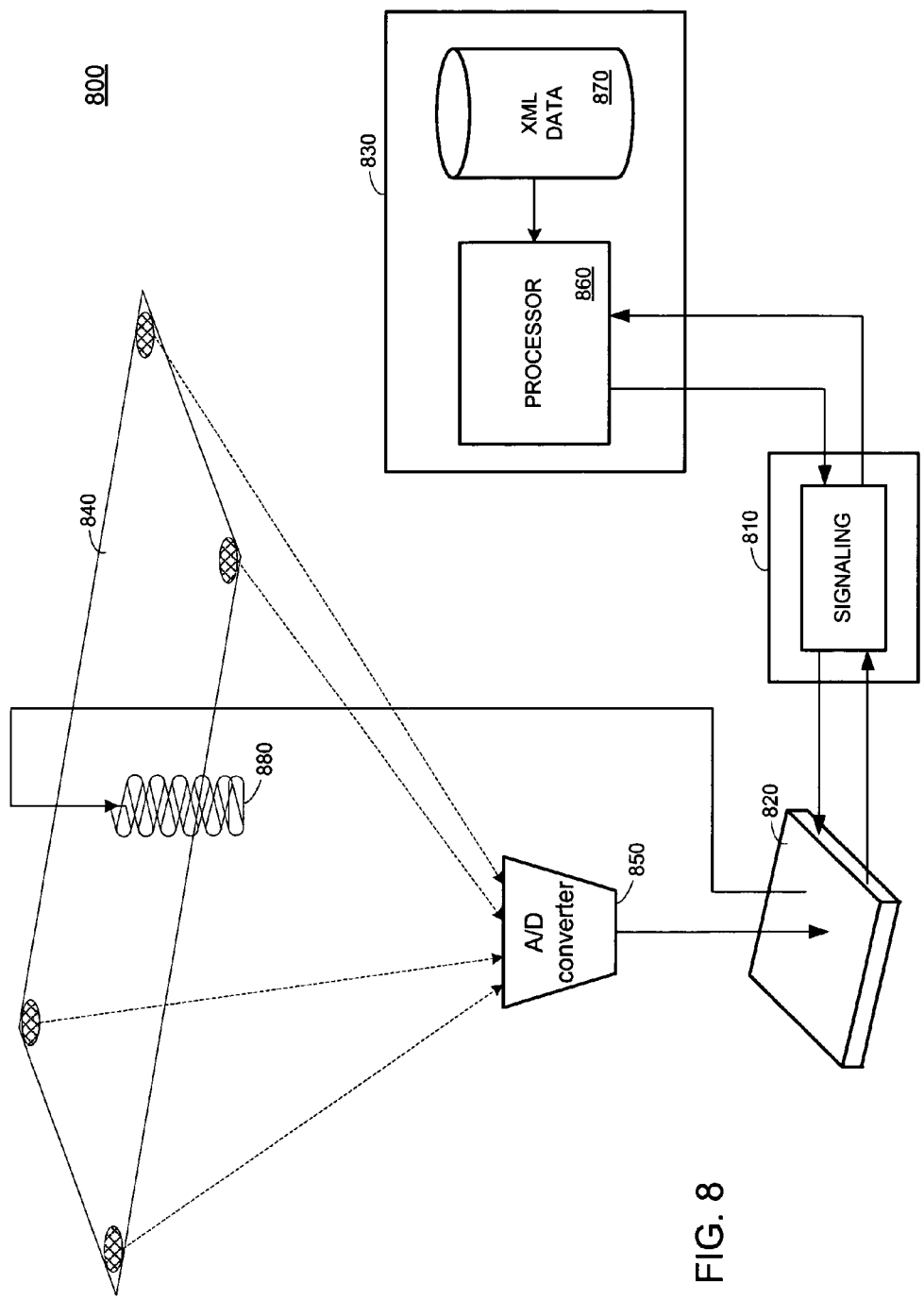
FIG. 8 comprises a diagram illustrating system operation according to some embodiments.

FIG. 8 illustrates an alternative embodiment in which telephone 810 does not include a processor capable of executing process 500. Accordingly, elements of process 500 may be distributed among touchscreen processor 820 and telephony switch 830.

In some embodiments, processor 820 comprises a low-cost processor, such as the TI® MSP 430, bundled into a single assembly with touchscreen 840. Processor 820 may execute any suitable operating system (e.g., the free operating system Tiny OS) and compiler. According to some embodiments, processor 820 executes code to poll A/D converter 850 and process data received therefrom as described above. Signaling circuitry of telephone 810 may be leveraged to transmit the processed data (e.g., touch location information) to telephony switch 830.

Processor 860 of telephony switch 830 may perform steps 530 through 550 based on the received data and on a telephone interface layout associated with telephone 810 and stored among XML data 860. If the received data is associated with touch feedback information, processor 860 may transmit commands to generate touch feedback to telephone 810. As illustrated, these commands may be passed on to processor 820, which drives the touchscreen circuitry and coil 880 based thereon. Handwriting recognition may be provided by system 800 as described with respect to system 700.

Figure 9:
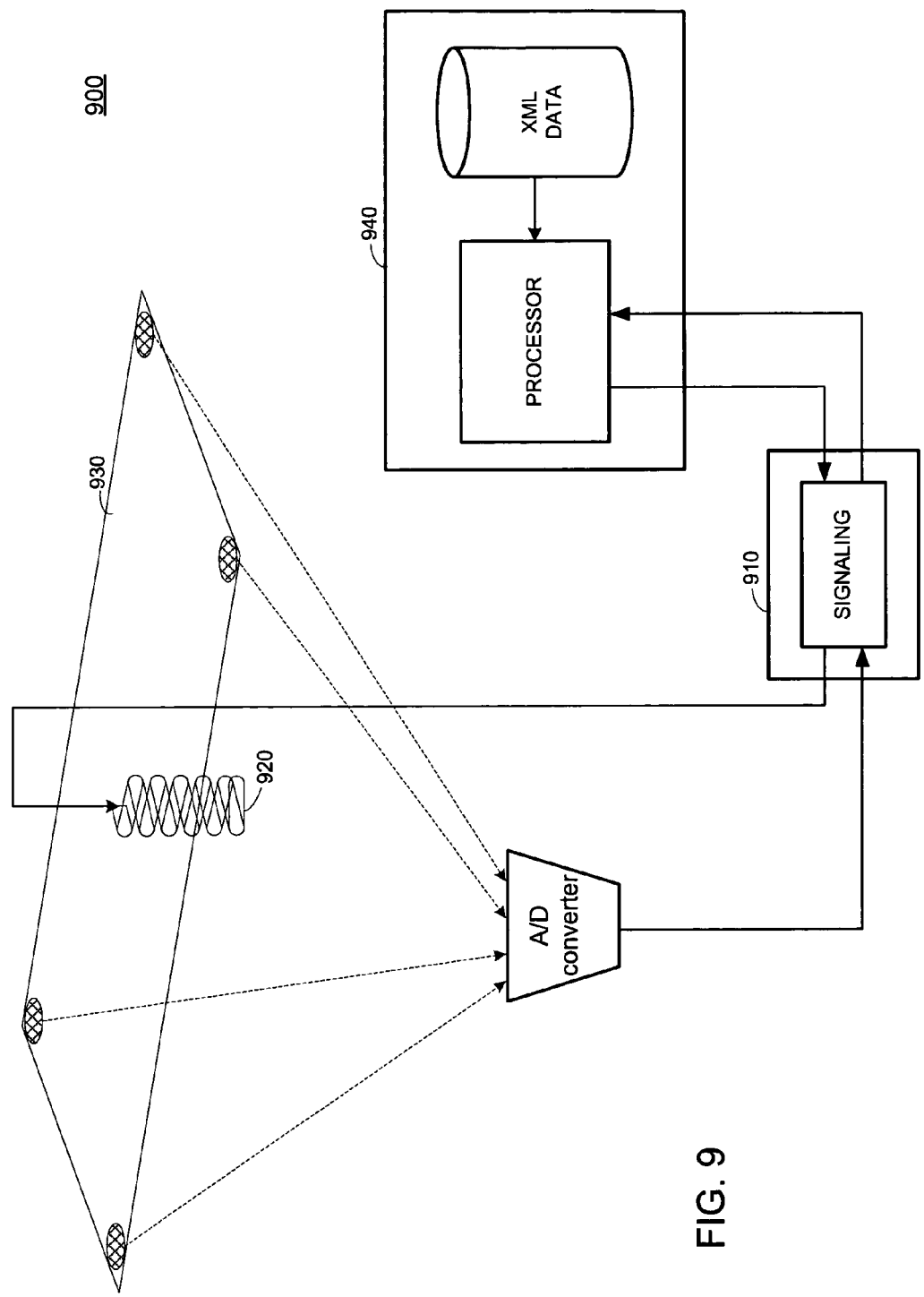
FIG. 9 comprises a diagram illustrating system operation according to some embodiments.

System 900 of FIG. 9 illustrates operation according to further embodiments. Telephone 910 includes elements (e.g., a processor) for driving the circuitry and coil 920 of touchscreen 930 to provide touch feedback. However, telephone 910 may pass touch location information to switch 940 and switch 940 may operate as described above with respect to switch 830.

According to some embodiments, one or more telephone interface controls of a telephone interface layout may provide input to more than one service. Such a scenario may be particularly beneficial in an embedded environment (e.g., a conventional desktop telephone) where resources are limited, and where it may therefore be necessary for services (directory, email, etc.) to be deployed in a distributed manner.

Figure 10:
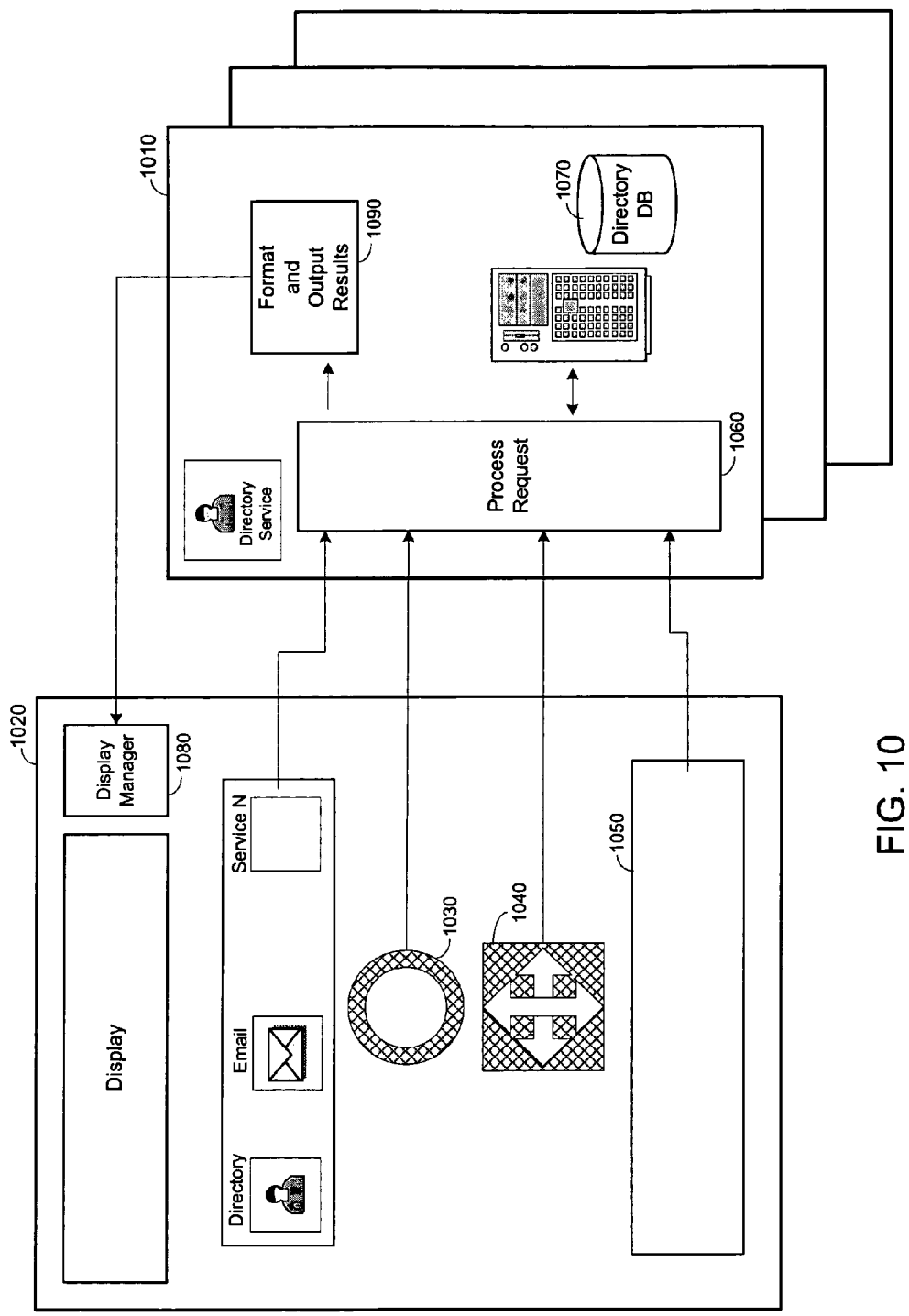
FIG. 10 comprises a diagram illustrating system operation according to some embodiments.

By way of example, FIG. 10 is a conceptual block diagram showing the currently-active directory service 1010 providing service to interface controls of telephone 1020. Accordingly, user input received by any of virtual wheel 1030, 4-way navigation button 1040, and handwriting input box 1050 is directed to directory process 1010. Module 1060 receives the input, performs a directory search by querying directory database 1070, and formats and outputs the results to display manager 1080 via module 1090.

According to some embodiments, the FIG. 10 framework may allow a user to enter a surname via handwriting input box 1050, and to use either virtual wheel 1030 or navigation button 1040 to scroll through the results. To support the framework, telephone 1020 may to maintain the notion of an active service to facilitate the transmission of all user inputs to an appropriate remote process corresponding to the active service. Such a notion may be maintained by enumerating services in the markup language-formatted telephone interface layout as shown below.

```
...
- <ServiceInfoList>
    - <ServiceInfo>
        <Name>Directory</Name>
        <LocationX>25</LocationX>
        <LocationY>25</LocationY>
        <Width>19</Width>
        <Height>12</Height>
        <CycleCount>10</CycleCount>
        <Delay>20</Delay>
        <CycleTime>280</CycleTime>
        <Damping>0</Damping>
        <Type>PictureBox</Type>
        - <Server>
            <IP>192.168.0.100</IP>
            <Port>65000</Port>
        </Server>
    </ServiceInfo>
    ...
- <ServiceInfoList>
- <WidgetInfoList>
    - <WidgetInfo>
        <Name>Navigation Button</Name>
        <LocationX>25</LocationX>
        <LocationY>111</LocationY>
        <Width>19</Width>
        <Height>12</Height>
        <CycleCount>10</CycleCount>
        <Delay>20</Delay>
        <CycleTime>280</CycleTime>
        <Damping>0</Damping>
        <Type>PictureBox</Type>
    </WidgetInfo>
    ...
</WidgetInfoList>
</LayoutData>
```

As shown, the enumerated services include the IP address and port number for a corresponding remote process. The specification of the telephone interface controls may remain unaffected and behave in the same way as described above.

According to some embodiments using a touchscreen having display capability, a user operates a telephone to place a call to a hotel. A hotel phone device transmits a telephone interface layout as described above to the user's telephone. The layout is read by the user's telephone to display a plurality of telephone interface controls and to provide operation based thereon as described above. For example, the layout may include controls labeled "reception", "reservations", and "restaurant", each of which may be selected (i.e., "pressed") by the user to place a call to an associated number.

According to some embodiments, the hotel phone device may transmit an imagemap which can be displayed by a mobile telephone browser. Selection of one of the displayed telephone interface controls may cause the telephone to invoke a corresponding URL, which may consist of a SIP event that generates a digit press.

According to some embodiments, 4-way navigation button 1040 may operate to detect the force applied thereto by a user. An increase in the force may cause acceleration of a corresponding activity (e.g., text scrolling on the screen). The increased force may also be confirmed to the user via increased touch feedback.

Some embodiments may provide layout modification on a telephone. Such embodiments would allow an end-user to design and/or modify a telephone interface layout using a telephone on which the layout is to be used. For example, the user may modify the shape, size, color and/or action associated with a telephone interface control.

According to some embodiments of the foregoing, a user may input a name and telephone number of a business acquaintance in order to create a new "speed dial" button corresponding to the acquaintance. Still other embodiments of the foregoing may allow a desktop telephone to receive an image captured by a camera phone and to integrate the image into a telephone interface layout to be used by the desktop telephone.

Any architecture and/or system described herein may include any number of devices and systems for transferring data, including but not limited to local area networks, wide area networks, telephone networks, cellular networks, fiber-optic networks, satellite networks, infra-red networks, radio frequency networks, and any other type of networks which may be used to transmit information between devices. Additionally, data may be transmitted using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

Embodiments described above are not intended to be limited to the specific form set forth herein, but are intended to cover such alternatives, modifications and equivalents as can reasonably be included within the spirit and scope of the appended claims.

What is claimed is:

1. A method for providing a telephone user interface comprising:
    receiving a first selection of a first telephone interface control from a plurality of telephone interface controls;
    receiving a first location associated with the first telephone interface control, the location comprising an X-Y coordinate location of the first telephone interface control on a display panel;
    receiving a first indication of an action to be performed when the first telephone interface control is executed;
    receiving a first touch feedback parameter that is associated with the first telephone interface control, the first touch feedback parameter comprising a type of haptic feedback and the first touch feedback parameter is defined such that the type of haptic feedback is generated based on the action to be performed when the first telephone interface control is executed;

prompting a user to submit a second selection of a second telephone interface control from the plurality of telephone interface controls;

a processor generating a first telephone interface layout, the first telephone interface layout comprising the first selection of the first telephone interface control, the first location associated with the first telephone interface control, the first indication of the action to be performed when the first telephone interface control is executed, and the first touch feedback parameter associated with the first telephone interface control, the first telephone interface layout defining a first image;

storing the first telephone interface layout in a non-transitory computer readable medium; and outputting the first telephone interface layout to a touch sensitive screen of a customizable telephone such that the first image defining the first telephone interface layout is displayed on the touch sensitive screen, wherein the outputting of the first telephone interface layout comprises printing the first image on a physical printed medium, the first image having the first telephone interface control illustrated thereon;

wherein a depression of the touch sensitive screen of the customizable telephone at the first location of the first telephone interface control executes the first telephone interface control and causes the action associated with the first telephone interface control to be performed; and attaching the physical printed medium to the touch sensitive screen and providing a data file that associates the first telephone interface layout, the physical printed medium secured to the touch sensitive screen, and the first location associated with the first telephone interface control on the touch sensitive screen.

2. The method of claim 1 wherein receiving the first selection of the first telephone interface control comprises receiving a selection of a target telephone model via a drop-down box.

3. The method of claim 1 wherein the first telephone interface control comprises a handwriting recognition application and the method further comprising transmitting handwriting received via the handwriting recognition application.

4. The method of claim 1 further comprising a layout manager application receiving the first selection of the first telephone interface control, receiving the first location associated with the first telephone interface control, receiving the first indication of the action to be performed when the first telephone interface control is executed, and receiving the first touch feedback parameter associated with the first telephone interface control, the layout manager application being stored in the non-transitory computer readable medium.

5. The method of claim 1 wherein receiving the first telephone interface control comprises receiving a widget from a toolbox and wherein receiving the first location of the first telephone interface control comprises determining a location of the widget using a snap to grid feature.

6. A system comprising:
a customizable telephone having a touch sensitive screen and a securing element;
a processor, the processor providing a plurality of telephone interface layouts;
a memory storing the plurality of telephone interface layouts, each one of the telephone interface layouts associating at least one telephone interface control with at least one respective touch location and a respective action to be performed by the at least one telephone interface control; and printing a physical medium, the printed physical medium comprising an image defined by a selected telephone interface layout of the plurality of telephone interface layouts, the image having the at least one telephone interface control illustrated thereon;

the securing element securing the printed physical medium to the touch sensitive screen;

the processor providing a data file that associates the selected telephone interface layout, the physical printed medium secured to the touch sensitive screen, and the at least one respective touch location for the at least one telephone interface control on the touch sensitive screen to the customizable telephone;

the touch sensitive screen receiving a bias and generating touch location information based on the bias;

the customizable telephone receiving the touch location information from the touch sensitive screen;

the customizable telephone determining a first telephone interface control of the at least one telephone interface control based on the touch location information received by the touch sensitive screen and the data file provided by the processor;

the customizable telephone determining an action to be performed based on the touch location information received by the touch sensitive screen and the data file provided by the processor; and the customizable telephone determining a touch feedback response to be provided upon receiving the bias, the touch feedback response comprising a type of haptic feedback and the touch feedback response is determined such that the haptic feedback is generated based on the first telephone interface control; and the customizable telephone providing the determined touch feedback response to the touch sensitive screen; and the customizable telephone performing the determined action.

7. The system of claim 6 wherein the first telephone interface control comprises a handwriting recognition application and the customizable telephone transmits handwriting received via the handwriting recognition application to a called party.

8. The system of claim 6 wherein the customizable telephone determines a touch feedback response to be provided upon receiving the bias and the processor providing the determined touch feedback to the touch sensitive screen.

9. The system of claim 6 wherein the processor is a processor of a hotel phone device that transmits the selected telephone interface layout to the customizable telephone.

10. A system for development of a telephone user interface comprising:
a processor;
an input device;
a non-transitory computer readable medium;
a customizable telephone having a touch sensitive screen and non-transitory memory;
the input device receiving a first selection of a first telephone interface control from a plurality of telephone interface controls stored in the non-transitory computer readable medium;
the input device receiving a first location associated with the first telephone interface control, the first location comprising an X-Y coordinate location of the first telephone interface control on a display panel;

the input device receiving a first indication of an action to be performed when the first telephone interface control is executed;

the input device receiving a first touch feedback parameter that is associated with the first telephone interface control, the first touch feedback parameter comprising a type of haptic feedback and the first touch feedback parameter is defined such that the type of haptic feedback is generated by the touch sensitive screen based on the action to be performed when the first telephone interface control is executed;

the processor prompting a user to submit a second selection of a second telephone interface control from the plurality of telephone interface controls;

a processor generating a first telephone interface layout comprising the first selection of the first telephone interface control, the first location associated with the first telephone interface control, the first indication of the action to be performed when the first telephone interface control is executed, and the first touch feedback parameter associated with the first telephone interface control, the first telephone interface layout defining a first image depicting the first telephone interface layout;

the non-transitory memory of the customizable telephone storing the first telephone interface layout;

wherein the first image is printed on a physical printed medium and the physical printed medium is attached to the touch sensitive screen via a securing element, the first image having the first telephone interface control illustrated thereon, and wherein a data file that associates the first telephone interface layout, the physical printed medium secured to the touch sensitive screen, and the first location associated with the first telephone interface control on the touch sensitive screen is communicated to the customizable telephone via the processor; and wherein a depression of the touch sensitive screen of the customizable telephone at the first location of the first telephone interface control executes the first telephone interface control and causes the action associated with the first telephone interface control to be performed.

11. The system of claim 10 wherein the input device receives the first selection of the first telephone interface control based on a selection of a target telephone model via a drop-down box.

12. The system of claim 10 wherein the first telephone interface control comprises a handwriting recognition application and the processor transmits handwriting received via the handwriting recognition application.

13. The system of claim 10 further comprising a layout manager application stored in the non-transitory computer readable medium receiving from the input device the first selection of the first telephone interface control, the first location associated with the first telephone interface control, the first indication of the action to be performed when the first telephone interface control is executed, and the first touch feedback parameter associated with the first telephone interface control.

14. The system of claim 10 wherein the first selection the input device receives is a widget from a toolbox and the first location of the first telephone interface control is a location of the widget determined using a snap to grid feature.

15. The system of claim 10 wherein the action to be performed when the first telephone interface control is executed is speed dialing a telephone number.

16. The system of claim 10 wherein the processor, the input device, and the non-transitory computer readable medium are located in a computer device that is connected to the customizable telephone via a communication link.

* * * * *